Nov. 3, 1970  R. D. REIS  3,537,317
RECORDER AND CONTROL INSTRUMENT
Filed April 9, 1968  7 Sheets-Sheet 1
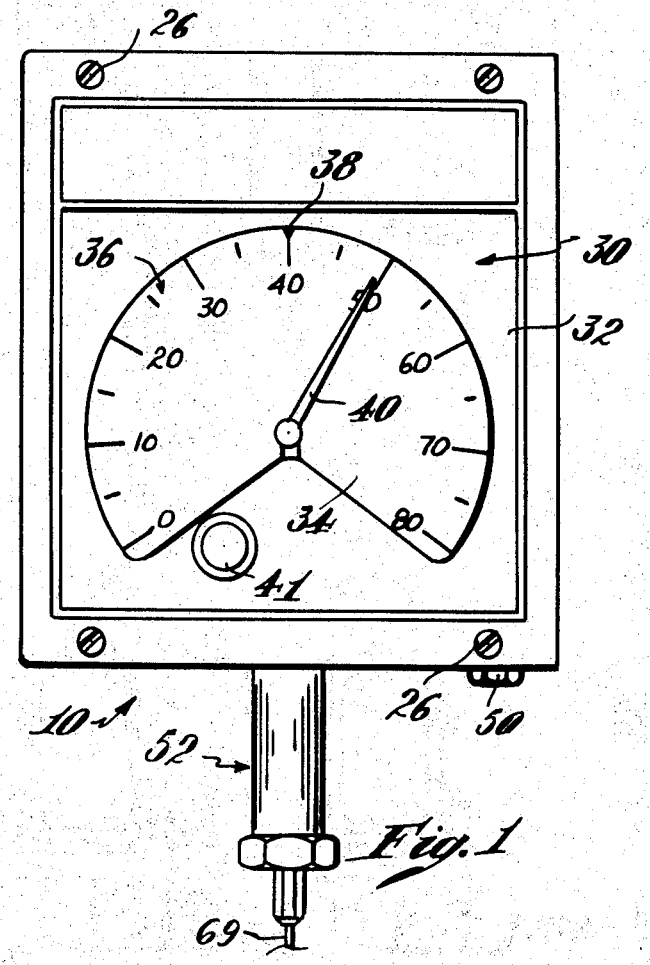
Fig. 1
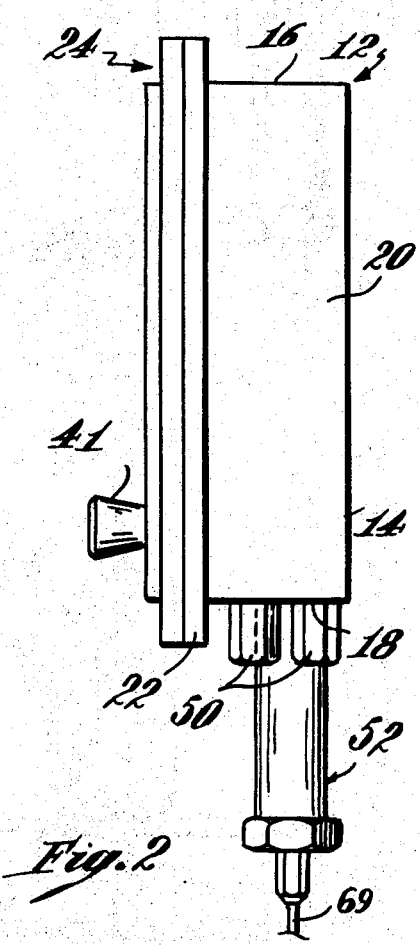
Fig. 2
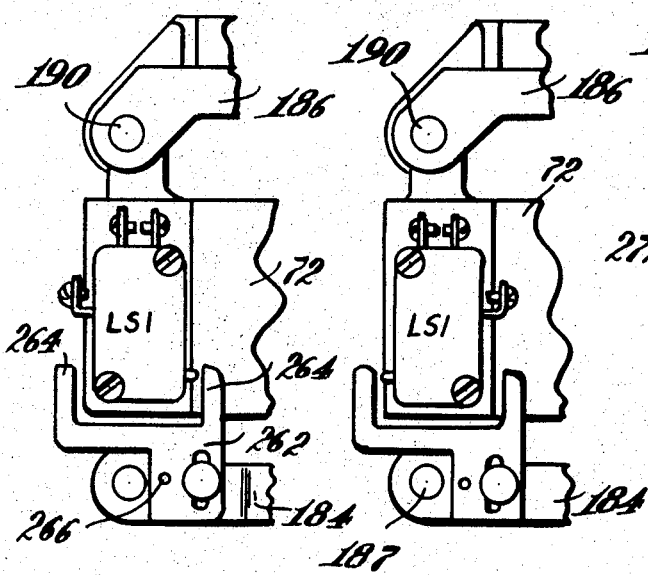
Fig. 3
Fig. 4
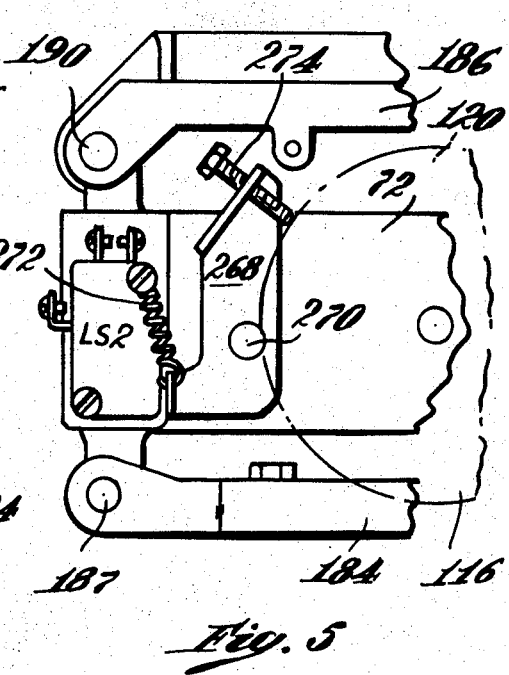
Fig. 5

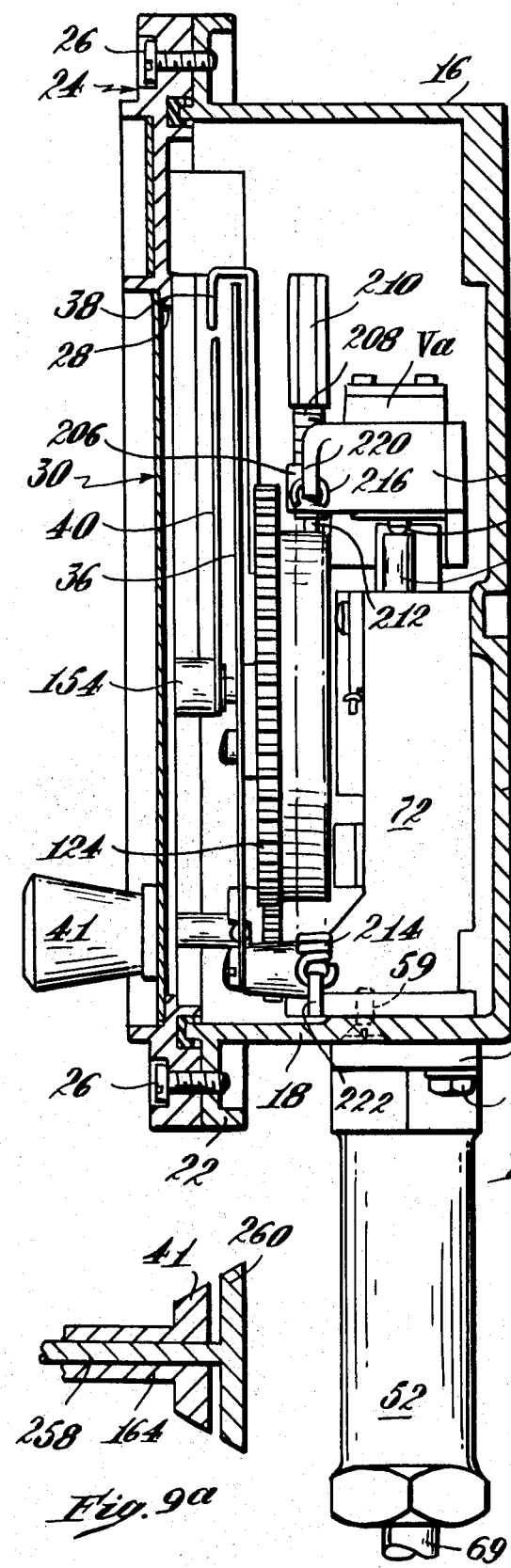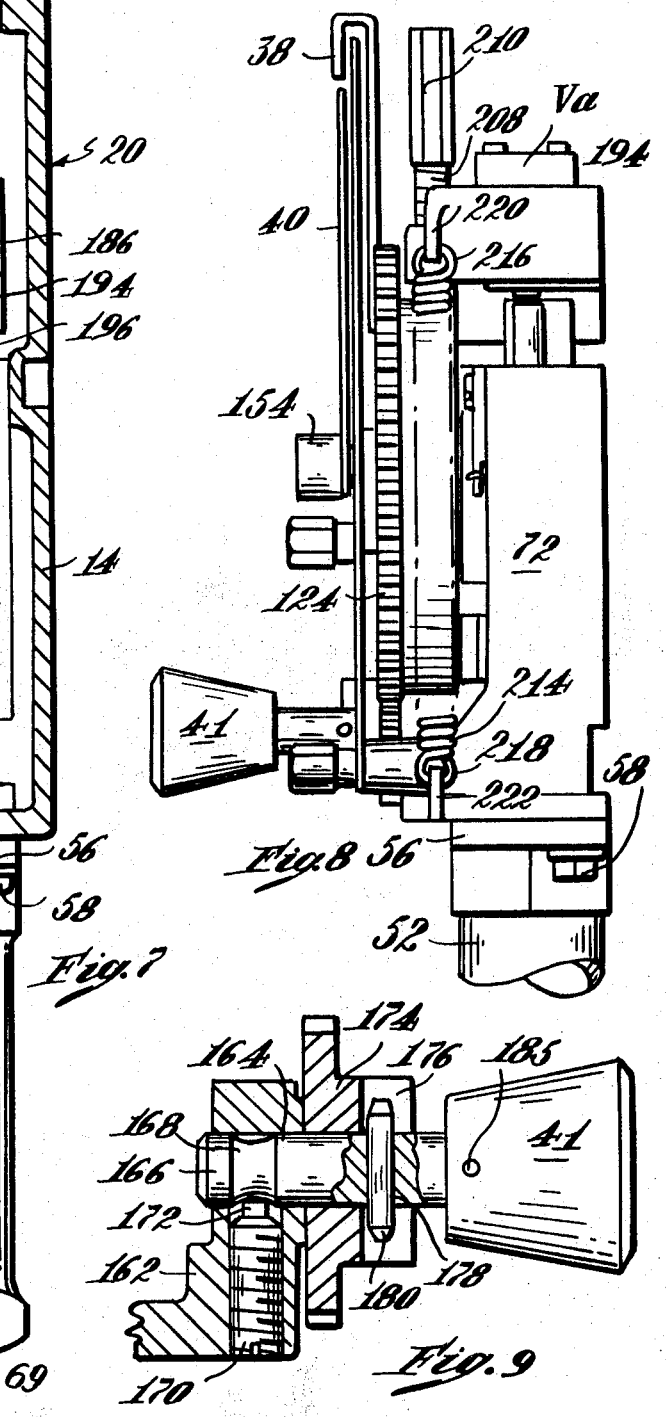

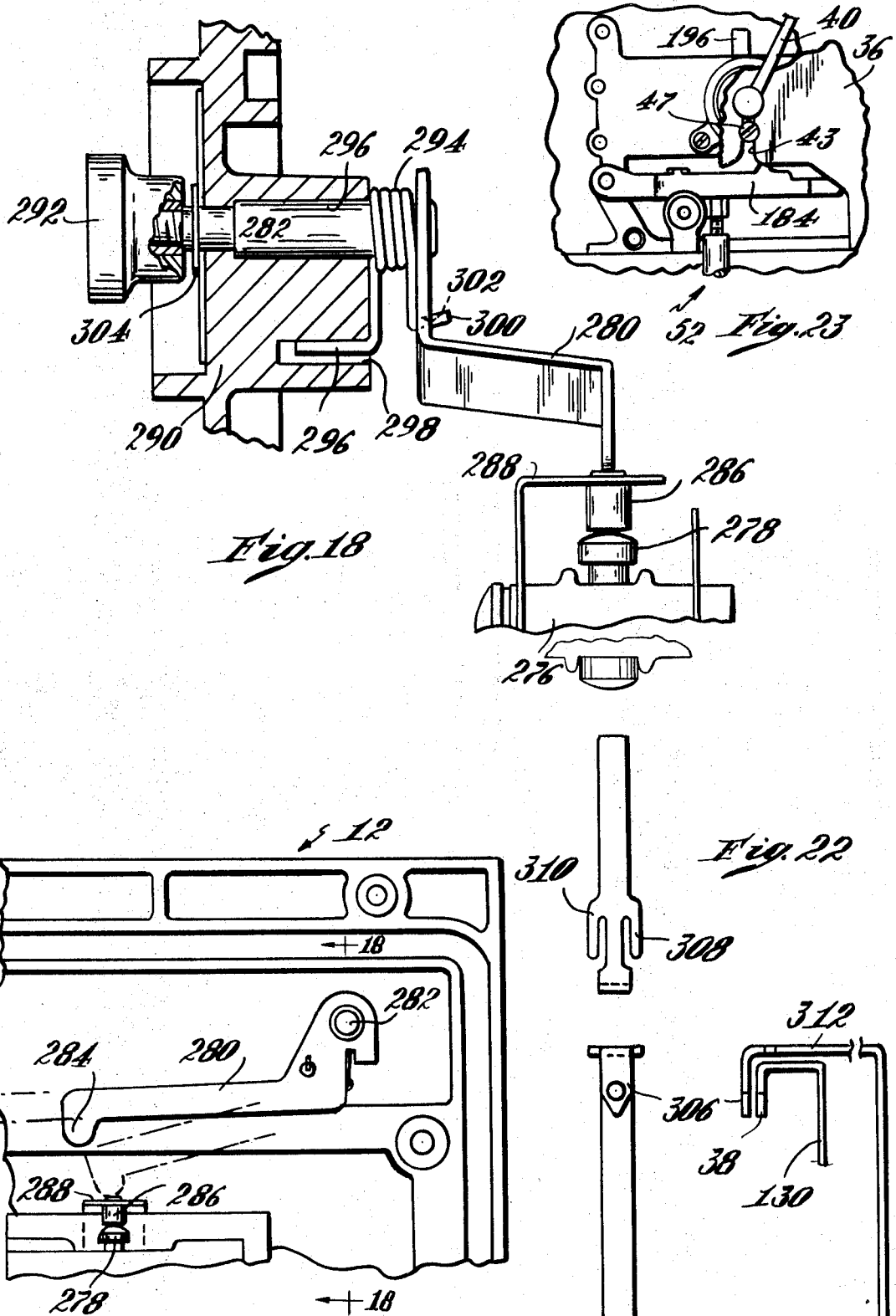

United States Patent Office 3,537,317
Patented Nov. 3, 1970

3,537,317
RECORDER AND CONTROL INSTRUMENT
Robert D. Reis, Hingham, Mass., assignor to United Electric Controls Company, Watertown, Mass., a corporation of Massachusetts
Filed Apr. 9, 1968, Ser. No. 719,962
Int. Cl. G01k 5/02; H01h 37/12
U.S. Cl. 73—388
24 Claims

ABSTRACT OF THE DISCLOSURE

A combination recorder and control instrument having a bellows expandable by an increase in temperature to move a pointer along a temperature scale and to actuate a valve or switch to terminate or initiate an operation at a predetermined temperature level; provided with adjustments to enable selecting the level at which the valve or switch becomes actuated; and provided with a structural frame designed to enable cascading several such instruments for multiple recording and/or control.

BACKGROUND OF THE INVENTION

The conventional instrument for recording and/or controlling industrial processes and machines comprises a temperature-responsive element and linkage operable thereby to move an indicator along the scale on a dial and/or to actuate a valve or switch assembled in a box provided with fittings for installation. Most of such instruments provide for recording and/or controlling a single operation so that if the process or operation embodies more than one operation and recording and/or control are essential it is necessary to employ several such instruments. A multiplicity of instruments becomes cumbersome, is undesirable because the initial cost is relatively high, increases the cost of maintenance, and increases the problem of properly evaluating the information dispersed on the dials of several instruments. Additionally, the availability of space may be a critical factor, making it impossible to employ more than one instrument for a given installation.

SUMMARY

The principal objects of this invention are to provide an instrument of the foregoing kind which enables multiple recording and/or controlling and of providing an instrument so designed that certain of its components may be cascaded to combine in one instrument at a single vantage point the functions of a plurality of instruments. Other objects are to provide an instrument which has simplicity of design, is reliable and contains safety limits which optionally require manual resetting.

As herein illustrated the instrument comprises a support, an actuator member and a carrier member mounted on the support for movement relative to each other, a transmitter member mounted on the support between the actuator member and carrier member with one end engaged with the actuator member, a part embodying an actuator element mounted on the carrier member with the actuator element confronting the other end of the transmitter member, said transmitter member being movable in response to the movement of the actuator member to cause said other end of the transmitter member to actuate said actuator element, and means for adjusting the initial position of the actuator element relative to said other end of the transmitter member to determine the condition at which the actuator element will be actuated. A cam supports the carrier member and is rotatable relative thereto to adjust the relative positions of the actuator element and the transmitter member. An adjustable screw is threaded through the carrier member with one end engaged with the cam and is adjustable to effect an initial calibration of the instrument. A spring yieldably holds the carrier member engaged with the cam surface. The carrier member is adapted to support a plurality of parts, each of which embodies an actuator element, for example a valve and/or a switch. A corresponding number of transmitter members are adapted to be mounted on the support for engagement with the actuator elements of the parts, and there is means operable to adjust the transmitter members relative to the actuator elements of the parts with which they are associated to effect actuation of the several parts at different times. A shaft is rotatably mounted on the support, there is means operable by the transmitter member to effect rotation of the shaft, and one end of a pointer is fixed to the shaft for movement relative to a scale on a dial. A limit switch may be mounted adjacent the actuator member together with means movable by the actuator member to effect actuation of the limit switch when the actuator member has moved a predetermined angular distance. A cut-off switch may be mounted adjacent the surface of the cam operable, in response to rotation of the cam beyond a predetermined limit, to disable the instrument. The supporting frame is designed to enable aligning two or more back to front to form a multiple support, each of which is adapted to support an actuator element, a carrier member, a transmitter member and one or more parts embodying actuator elements, to wit, valves and/or switches. The compounding of the supporting frames is achieved by means of an adapter having a forward end interengageable with a recess in the rear side of a supporting frame and a rear end engageable with a recess in the forward side of a supporting frame to join two such frames in spaced parallel relation. The composite instrument as thus made up comprises two supporting frames joined by an adapter, extending from the forward side of the first of the supporting frames, cams on the respective adapters, actuator, carrier and transmitter members on the respective supporting frames, one or more valves or switches on the carrier members, a single dial supported at the forward side of the first of the supporting structures, a plurality of pointers movable along a common scale or multiple scale, telescoping shafts connected, respectively, to the transmitter members of the supporting frames to which the pointers are respectively connected, and telescoping shafts provided with means engaged respectively with the cams to enable adjustment of the cams independently of each other.

The invention will now be described in greater detail with reference to the accompanying drawings wherein:

FIG. 1 is a front elevation of the instrument;

FIG. 2 is a side elevation of the instrument as seen from the right-hand side of FIG. 1;

FIG. 3 is a fragmentary detail interiorly of the instrument showing the position of a low temperature limit switch;

FIG. 4 is a corresponding view showing a high temperature limit switch;

FIG. 5 is a fragmentary elevation interiorly of the instrument showing a cam controlled cut-out switch;

FIG. 7 is an elevation, taken from the right side of FIG. 6, partly in section;

FIG. 8 is an elevation of the component parts of the instrument removed from the instrument housing;

FIG. 9 is a fragmentary view, partly in section, taken on the line 9—9 of FIG. 6;

FIG. 9a is a fragmentary view, partly in section, of the structure shown in FIG. 9 modified for multiple control;

FIG. 18 is an elevation, partly in section, of a reset actuator;

FIG. 19 is an elevation taken from the right side of FIG. 18;

FIG. 20 is a front elevation of an arrangement of two index members when cascading two or more units;

FIG. 21 is a side elevation of the two index members shown in FIG. 20;

FIG. 22 is a top elevation of the index members shown in FIGS. 20 and 21; and

FIG. 23 is a fragmentary front elevation of the instrument modified for temperature indication without control.

Figure 6:
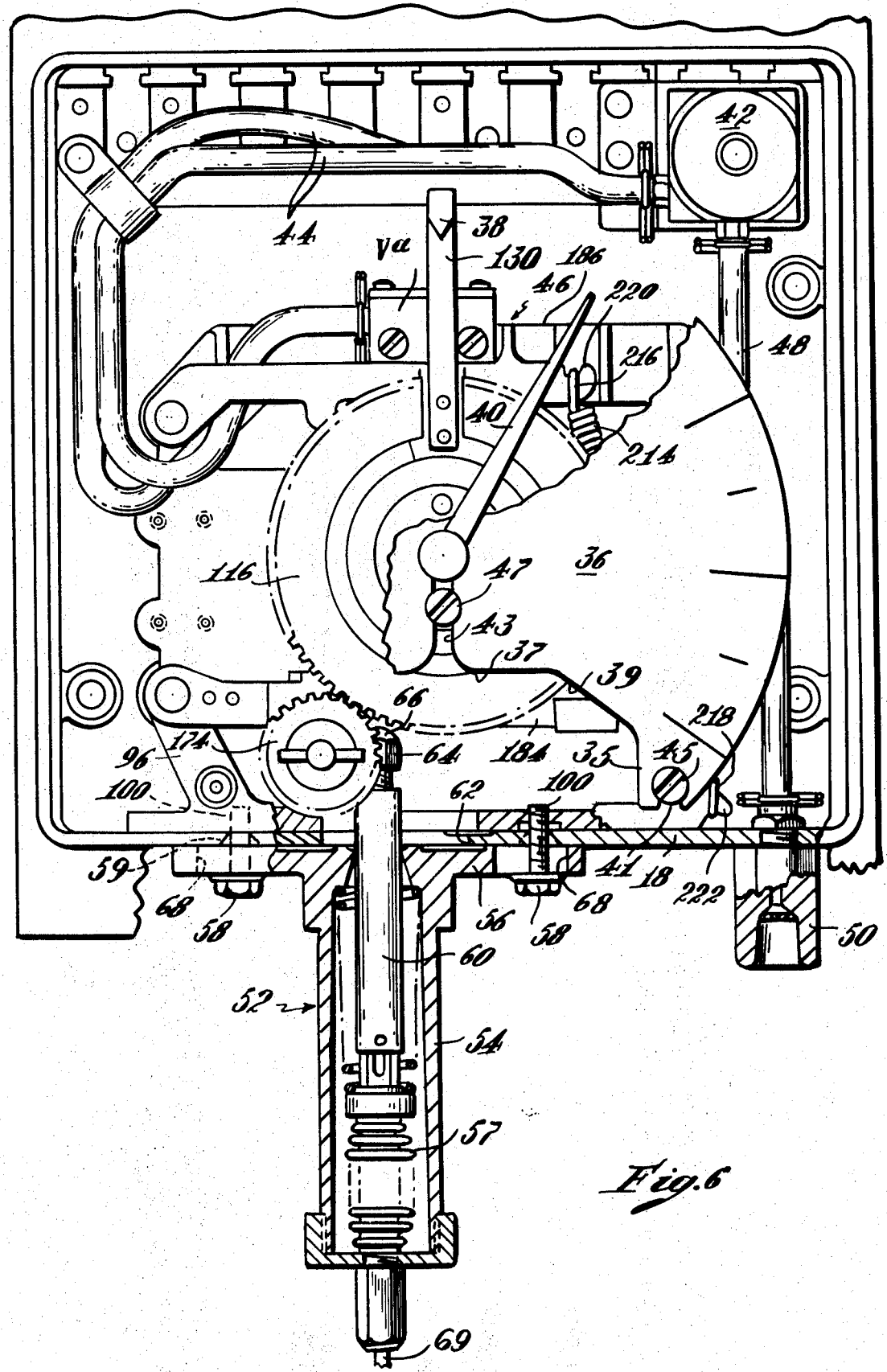
FIG. 6 is a front elevation of the instrument with the front cover removed and with parts in section.

Referring to the drawings (FIGS. 1 and 2), the instrument is provided with a housing 10 of substantially rectangular configuration comprising a back part 12 having a back wall 14 and top, bottom and side walls 16, 18 and 20 projecting forwardly therefrom which collectively form an open face receptacle peripherally of which there is a laterally projecting flange 22. A front part 24 is fastened over the open face against the flange 22 by a screw bolt 26. The front part 24 contains a more or less centrally located opening 28 (FIG. 7) within which there is secured a plastic plate 30 having an opaque portion 32 and a transparent portion 34 (FIG. 1) through which there is visible a graduated dial 36, an index 38 and a pointer 40. A knob 41 projects forwardly from the outer face of the plate 30 through the opaque portion thereof, and, as will appear hereinafter, provides for adjusting the position of the index 38 relative to the scale on the dial 36.

Within the housing 10 there is shown an on-off pneumatic valve 42 (FIG. 6). The on-off pneumatic valve 42 is connected by conductors 44 to a valve Va which, in turn, is mounted in conjunction with indicating mechanism 46 for operation in response to thermal responsive means 52 and by conductors 48 to nipples 50 secured to the bottom wall 18. The on-off pneumatic valve 42 is exemplary of one use of the device. Alternatively the on-off pneumatic valve may be omitted and an electric switch S1 (FIG. 12) substituted for the valve Va.

The thermal responsive device 52 comprises a cylindrical housing 54, provided with a lateral flange 56 at one end, and is attached to the lower wall 18 of the housing by bolts 58 secured to the flange. A thermally neutral part 60 is supported in the housing 54 with one end extending through an opening 62 in the lower wall 18 into the housing and has threaded on its inner end a nut 64 adjustable thereon to increase or decrease the effective length of the part 60. The nut 64 has a substantially hemispherical end 66 for contact with an actuating arm 184 forming part of the control and indicating mechanism as will appear hereinafter.

Figure 10:
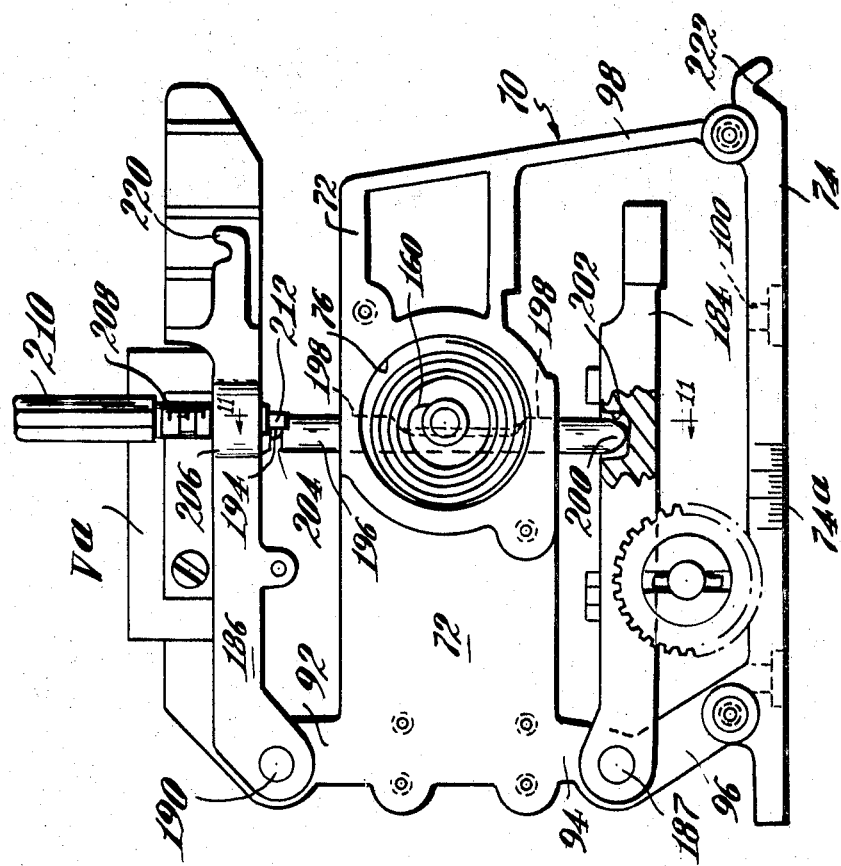
FIG. 10 is a front elevation of the unit removed from its housing shown partly in section.

The opening 62 is elongated and the flange 56 contains elongate holes 68 so that the housing 54 may be adjusted longitudinally relative to the actuating arm to shift the point of contact of the nut 64 therewith. A scale 74a (FIG. 10) provides for making adjustments. A bellows 57 is mounted within the housing between the lower end of the part 60 and the bottom of the housing with one end attached to the part 60 and the other end secured to the bottom of the housing. Expansion of the bellows effects axial movement of the part 60. A capillary tube 69 connects the bellows to a bulb (not shown) which contains an expandable fluid by means of which the bellows is caused to expand in response to a rise in temperature. A pressure-responsive device of this kind is shown in U.S. Pat. No. 3,411,360, filed Oct. 21, 1965 in the name of John A. Denner for Temperature Controller and Recorder With Compensator.

The control and indicating mechanism 46 comprises a frame 70 in the form of a unit casting (FIGS. 10 and 11) having a top part 72 and a base part 74. The top part contains in its front side a circular recess 76 and in its back side a circular recess 78. Between the recesses 76 and 78 there is a chamber 80 of smaller diameter than the recess 76 and a wall 82 which provides, respectively, an annular shoulder 84 at the bottom of the recess 76 and an annular shoulder 86 at the bottom of the recess 78. The wall 82 contains a centrally located bearing opening 88 and bolt holes 90.

Figure 11:
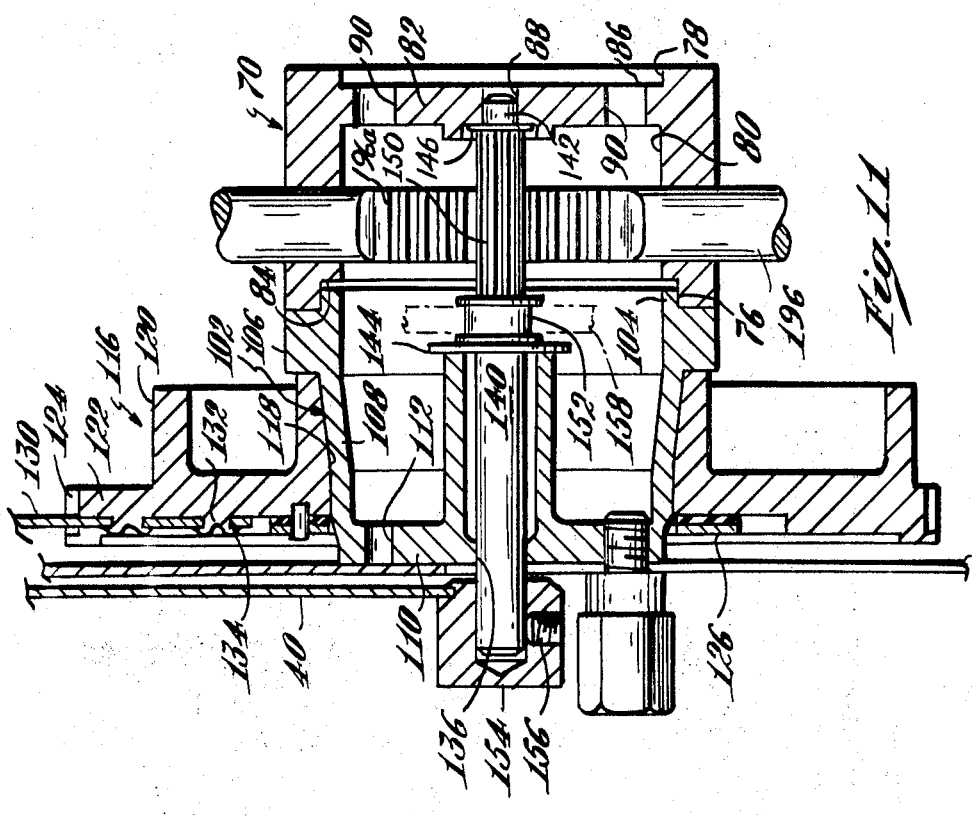
FIG. 11 is a section to much larger scale taken on the line 11—11 of FIG. 10.

At one end of the frame 70 (the left as shown in FIG. 11), there are upwardly and downwardly projecting arms 92 and 94 and the latter has an extension 96 which, in conjunction with a web 98 at the opposite end, joins the top part 72 to the base part 74. The base part contains threaded holes 100, as illustrated in FIG. 6, for receiving the bolts 58 which function to attach the temperature-responsive means to the instrument housing. Screws 59 (FIGS. 7 and 8) secure the frame 70 within the housing.

An adapter part 102 (FIG. 11) having an annular end portion 104 corresponding in outside diameter to the inside diameter of the recess 76 is mounted in the recess. The adapter part has an annular shoulder 106 which, by engagement with the front side of the part 72, fixes its position. Forwardly of the annular shoulder 106 there is a forwardly tapering hub 108, the forward end of which has a diametrical wall 110 containing bolt holes 112 which are adapted in conjunction with the bolt holes 90 to receive bolts by means of which the adapter and frame are held together.

A cam disc 116 containing a tapered hole 118 is mounted on the tapered hub 108 against the shoulder 106 and has a cam surface 120 which is eccentric with respect to the axis of the adapter, and a circular part 122 which is concentric with the axis of the adapter part 102 upon which there are teeth 124. The exposed face of the circular part 122 is recessed and a pair of washers 126 mounted on the forward end of the hub and secured to the face of the circular part 122 by screw bolts 128 hold the cam disc 116 on the hub.

The index member 38 (FIG. 6) is formed at the outer end of an arm 130 (FIGS. 7 and 11) by bending the end forwardly over the edge of the dial and downwardly parallel thereto. The inner end of the index arm is secured in the recess by lugs 132 which extend through holes 134 in the arm 130. The projecting ends of the lugs 132 are enlarged, for example, by peening.

The wall 110 at the forward end of the adapter 102 contains a central bearing opening 136 forming a bearing which in conjunction with the bearing 88 in the wall at the rear end of the casting provides support for a shaft 140. The rear end of the shaft 140 has a reduced portion 142 rotatably supported in the bearing 88 and the forward end of the shaft 140 projects through the bearing opening 136 and through the face of the dial. Collars 144 and 146 fixed in grooves in the shaft 140 and bearing, respectively, against a hub 148 extending inwardly from the wall 110 and the bottom of the recess at the inner side of the wall 82, prevent axial movement of the shaft while permitting its rotation. The shaft 140 has on it a pinion gear 150 and a spool 152, both of which are located within the chamber provided by the frame 70 and the adapter part 102. On the forwardly projecting end of the shaft 140 there is a cap 154 secured thereto by a set screw 156 to which one end of the pointer 40 is fastened. The pointer is parallel to the outer surface of the dial and its distal end is adapted to be moved along the scale on the surface thereof. A coiled spring 158 mounted on the spool 152 with one end 160 fastened to the spool and the other end to the adapter part 102 allows for preloading the shaft 140 so that the pointer at rest occupies a predetermined position on the scale.

The base part 74 has an upwardly projecting boss 162 (FIG. 9) containing a bearing opening 164 in which there is rotatably supported a shaft 166. The shaft 166 contains a peripheral groove 168 and a set screw 170 having a nub 172 at its inner end, by engagement with the groove 168, holds the shaft 166 against axial displacement while permitting its rotation. A gear 174 is mounted on the shaft 166 and contains a diametrical slot 176 which coincides with a diametrical hole 178 in the shaft 166 for receiving a locking pin 180. The knob 41 is fastened by a set screw 185 to the outer end of the shaft 166 and provides means by means of which the gear 174 which meshes with the gear teeth 124 on the cam disc may be rotated on the adapter to rotate the index relative to the scale on the dial.

One end of the actuator arm 184, with the underside of which the nut 64 has engagement (FIG. 10), is mounted on a pin 187 supported by the arm 94 so as to extend forwardly therefrom, that is, from left to right, as shown, between the lower side of the top part 72 and the upper side of the base part 74. One end of a carrier arm 186 is mounted on a pin 190 supported by the arm 92 so as to extend forwardly therefrom, that is, from left to right above the upper side of the top part 72. The two arms 184 and 186 are more or less parallel to each other and located at opposite sides, that is, above and below the part 72. As shown in FIGS. 6 to 11, inclusive, the valve Va is of the pneumatic type and is mounted on the carrier arm 186 with its actuating element 194 projecting downwardly therefrom in alignment with the upper end of a transmitter rod 196 slidably supported in vertically aligned holes 198 in the part 72 with its lower hemispherical end 200 resting in a hemispherical hole 202 in the actuator arm 184. The upper end 204 of the transmitter rod 196 is preferably flat. A boss 206 extends laterally from the carrier arm 186 and contains an internally threaded, vertically disposed hole for reception of an adjusting screw 208 provided with a head 210 at its upper end by means of which it may be rotated. A nub 212 at the lower end of the screw bears upon the surface 120 of the cam disc 116 so that by adjusting the screw 208 the relation between the lower end of the actuator element 194 and the upper flat end 204 of the transmitter rod may be calibrated. The transmitter rod 196 has on it a rack 196a which meshes with the gear 150 so that movement of the rod rotates the shaft 140.

The carrier arm 186 is yieldably held with the nub 212 bearing against the cam surface 120 by a coiled spring 214 (FIGS. 7 and 8) having loops 216 and 218 at its opposite end which are, respectively, engaged with a hook 220 on the carrier arm 186 and a hook 222 on the base part 74.

The valve Va as related above operates when opened and closed to change the pressure drop between the input and output and is employed to relate the changes in temperature sensed by the sensing bulb so as to terminate or initiate an operation or process.

Figure 12:
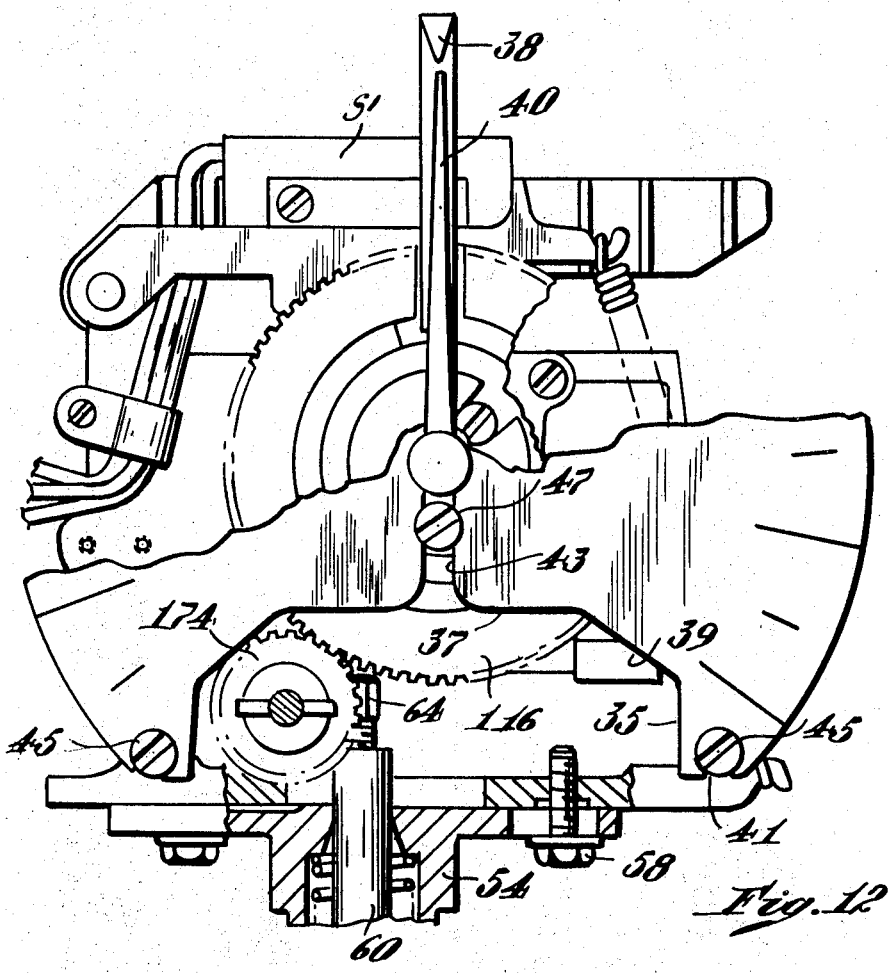
FIG. 12 is a front elevation of the device removed from its housing shown partly in section and provided with an electric switch.
Figure 13:
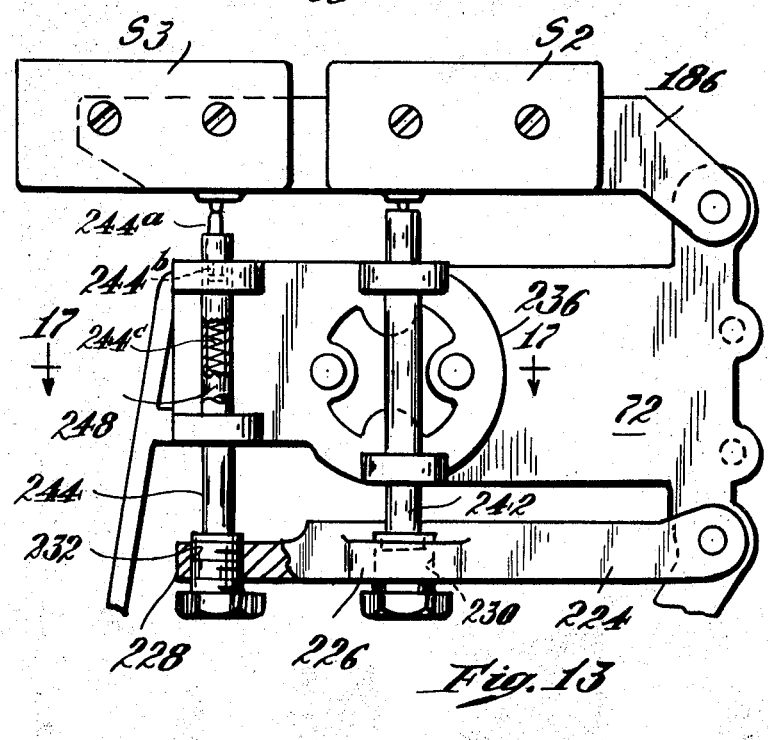
FIG. 13 is an elevation of the unit from the rear side modified to provide for multiple switches.

As related above, an electric switch S1 may be substituted for the pneumatic valve Va as shown in FIGS. 12 and 13. When a switch is employed the on-off pneumatic valve 42 is omitted and activation of the switch through a suitable circuit will provide for terminating, initiating or modifying operation of a machine or process. A salient feature of the invention resides in the fact that a plurality of switches S2, S3 and S4 (FIGS. 13 and 14) may be attached to the carrier arm 186 for multiplying the control. It is also within the scope of the invention to employ a mixture of pneumatic valves and electric switches if two kinds of control are desired.

Figure 16:
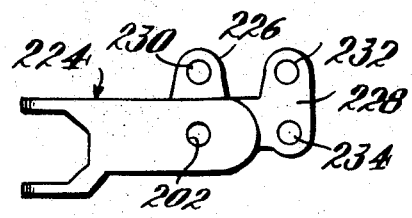
FIG. 16 is a plan view of an actuator arm designed for supporting a plurality of actuator rods.
Figure 17:
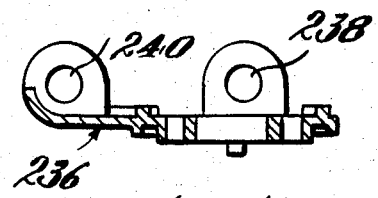
FIG. 17 is a plan view of a guide frame used in conjunction with the actuator arm shown in FIG. 16.

When additional valves and/or switches are added to the carrier arm, the actuator arm 184 is removed and replaced by an actuator arm 224 (FIGS. 13 and 16) having lateral and longitudinal extensions 226 and 228 containing holes 230, 232 and 234. A bracket 236 (FIGS. 13 and 17) is fastened to the part 72 above the actuator arm 224 containing vertically situated holes 238 and 240 for two transmitter rods 242 and 244 which are supported with their lower ends in the holes and their upper ends in alignment with the actuating element of the added valves and/or switches. Holes 246 in the casting above the holes 234 in the extension are provided for supporting the third rod 248. The holes 230, 232 and 234 are threaded to receive threaded studs by means of which the rods may be adjusted heightwise relative to the switches (FIG. 13). The switch S3 is normally set to actuate before or simultaneously with the switch S2 ond to prevent damage to the switch S3 the rod 244, as shown in FIG. 13, is axially hollow and contains at its upper end a pin 244a slidably supported in a sleeve 244b against a spring 244c set into the rod in compression against the inner end of the pin 244a, so as to hold the outer end of the pin distended. The spring 244c is designed to be stiff enough to actuate the switch S3 and thereafter to permit the pin to yield without damage to the switch S3. A switch S4 may also be mounted on the carrier 186 without requiring any enlargement of the housing within which the unit is mounted. Since switch S1 normally is not actuated by an overtravel or collapsible transmitter rod it must be set to operate at a higher temperature setting than switch S4.

The instrument is described as a control and for this purpose is provided with one or more valves and/or switches operable under certain conditions to initiate or terminate an operation. If control is not required the instrument can be easily converted to function solely as a temperature indicator. Thus, as shown in FIG. 23, by removing the carrier arm 186, the switch S1 or valve Va, the cam 116, the spring 214 and the adjusting knob 41, the thermally responsive device 52, which is no more than a thermometer, will by a rise in temperature raise the actuator arm 184 and hence the transmitter rod 196. Raising the transmitter rod 196 will inturn rotate the gear 150 and hence the shaft 140 to which the pointer 40 is attached to move it across the scale plate. When the temperature falls the arm 184 is lowered by rotation of the shaft 140 in the opposite direction by the spring 158.

Figure 15:
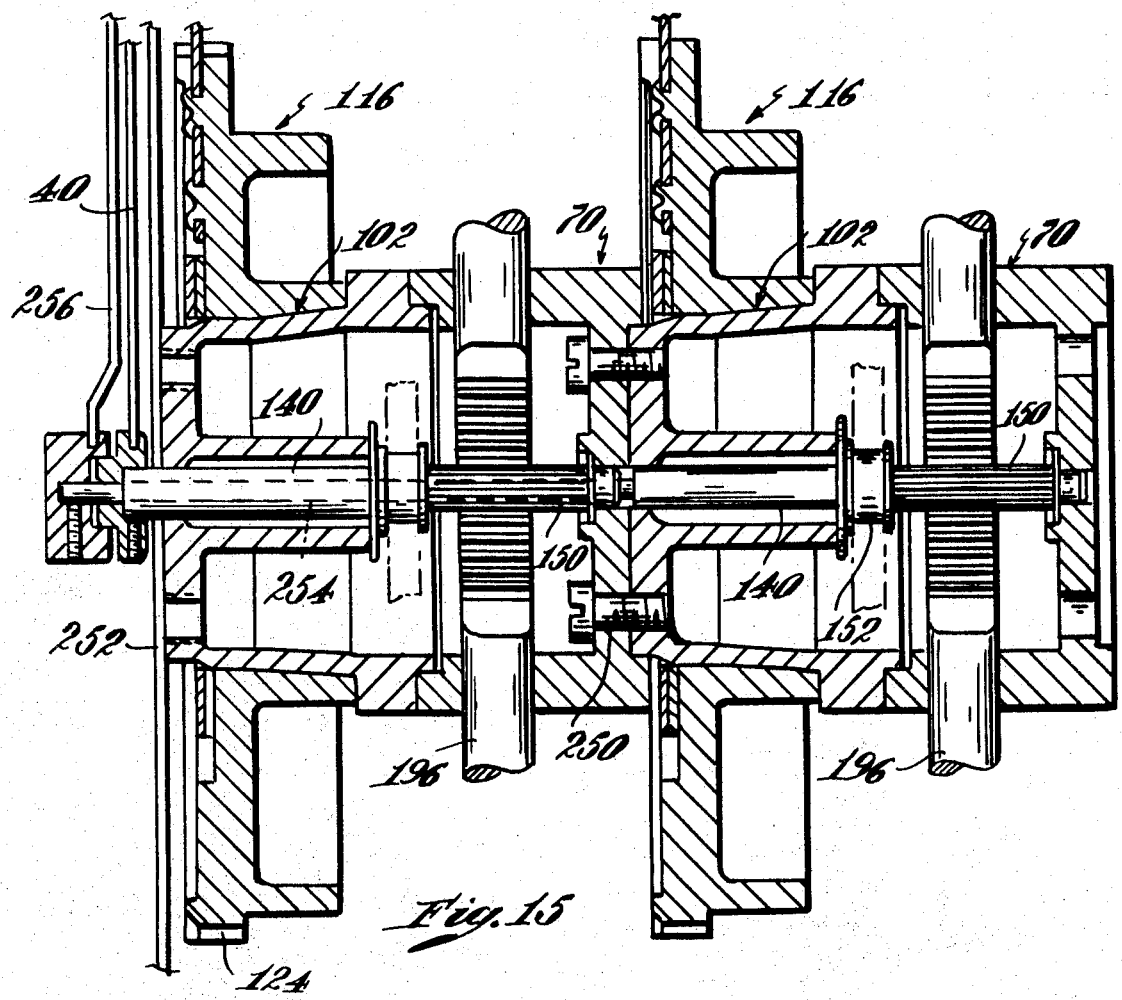
FIG. 15 is an enlarged section illustrating cascading of two units.

An important feature of the instrument as herein illustrated resides in the fact that several assemblies of the foregoing make-up may be employed in series or cascaded so as to enable simultaneously controlling several processes or systems at a common point. Cascading of the assemblies is accomplished by employing the adaptor 102 to join the rear side of one frame to the front side of the frame rearwardly thereof (FIG. 15). Bolts 250 are provided for this purpose. When two or more frames are cascaded each will have a pressure-responsive member, an actuator arm and carrier arm adapted for one or more actuator rods and one or more valves or switches, and a cam. A larger housing of appropriate size will be provided to receive several of the devices when cascading to provide for multiple control. Preferably only one indicator dial 252 will be employed with a multiple scale or several scales. The shaft 140 of the first frame is bored or drilled longitudinally and a spindle 254 extends forwardly through it from the shaft 140 of the second frame through the dial 252 and has on its protruding end a second pointer 256. Similarly, the shaft 164, by means of which the cam disc is adjusted, is drilled longitudinally for reception of the spindle 258 (FIG. 9a) which extends rearwardly through it to the shaft 166 of the second frame. A knob 260 fastened to the spindle 258 provides for effecting rotation of the cam disc mounted on the second frame.

The instrument converted to use simply as a thermometer as related above is capable of cascading of two or more such instruments in the same manner as described for cascading two or more instruments designed for control purposes.

In to provide for optional upper and lower limits of operation a limit switch LS1 is mounted on the limits of operation a limit switch LS1 is mounted on the top part 72 of the frame 70 above the rear side of the actuator arm 184 as shown in FIGS. 3 and 4. A switch plate 262 having spaced parallel limbs 264 is pivotally mounted on a pin 266 so that angular movement of the plate 262 will move one of the limbs toward and away from the actuator element extending from the switch. In FIG. 3 the actuator element is shown confronting the right one of the limbs 264 and in this arrangement the limit switch will function as a low limit cut-off whereas in FIG. 4 the actuator of the switch confronts the lefthand limb and will function to control the high limit cut-off. In lieu of the low and high limit switches a cut-off switch LS2 may be employed as shown in FIG. 5 which operates to render the apparatus inoperative if the cam is rotated to a too high setting. The switch LS2 is mounted adjacent the cam surface 120 and its operation is effected by a lever 268 pivotally supported on a pin 270. The lower end of the lever 268 is held against the switch actuator by a spring 272 and the upper end has a screw 274 threaded through it which bears upon the surface of the cam. Rotation of the cam beyond a predetermined angular distance will rock the lever 268 counterclockwise thereby releasing the activating element of the limit switch LS2. The switches LS1 and L2 may be superposed so that low, high an cut-off limits may be available.

Figure 14:
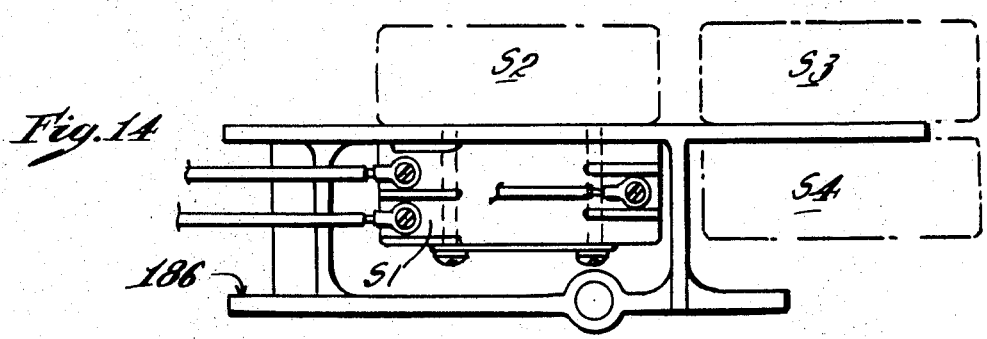
FIG. 14 is a plan view of a carrier arm with a plurality of switches attached thereto.

It may be desirable to employ a valve or switch in place of valve Va shown for example in FIGS. 6, 7, 8 and 10 or the switches S1, S2, S3 and S4 as shown for example in FIGS. 2, 13 and 14, with a push button type of actuating element so that when displaced by the actuating rod in response to a predetermined pressure rise it will remain in this position until displaced in the opposite direction. Provision for manually repositioning the switch is provided herein so as to make it necessary for the operator to determine the condition of the system before restoring it to its operative condition as shown in FIGS. 18 and 19. A valve 276 of the pushbutton type having "on" and "off" positions provided with an actuating element 278 which is extended in its cut-off position is shown in FIG. 18. The actuating element 278 must be depressed to return it to its operative position. The resetting means comprises a lever 280 fixed at one end to a shaft 282 for rotation about the axis of the shaft and movement of its distal end 284 against a nub 286 supported by a flexible arm 288 above the switch. The shaft 282 is mounted on a bearing 290 formed in the front part of the housing and has secured to its outer end a knob 292 by means of which it may be rotated. A coiled spring 294 is mounted on the inner end of the shaft 280 with one end 296 bent and lodged in a hole 298 in the front part and the other end 300 bent and lodged in a hole 302 in the arm. A collar 304 mounted on the shaft 282 between the outer side of the bearing 290 and the knob 292 constrains the shaft against axial movement. Normally the lever 280 is held away from the nub 286 and to return the switch to its operative position it is necessary to grasp the knob 292 and rotate the lever 280 downwardly to press the nub 286 against the switch actuating element 278. As shown in FIG. 19 the lever 280 may be extended as shown in dotted lines to reach the particular switch which is to be operated thereby. One or more arms may be employed where more than one switch or valve is used. Where reset or limit control is used an independently functioning regular controller is usually required. A particular feature of the cascaded system is the combining of these two functions in a single compact housing.

When cascading several units it may be desirable to limit the movement of the index member of one unit relative to that of another. This is accomplished as disclosed in FIGS. 20, 21 and 22 by providing, for example the index member 306 which extends forwardly beyond the index member 38 and providing it with a pair of deformable fingers 308, 310 on the horizontal limb 312 of the index supporting arm 130. The fingers 308 and 310 project laterally from opposite sides of the limbs 312 in transversely spaced parallel relation to the limb of the index 38 and are bendable downwarly relative to the horizontal limb to a position in the path of movement of the index 38. By bending the arm 308 at the left downwardly counterclockwise movement of the index may be limited and by bending the arm 310 at the right downwardly clockwise movement of the index may be limited. The arms may be bent back to an out of the way position when not desired.

The dial 36 as shown in FIG. 6 has on its lower half an opening located symmetrically with respect to a perpendicular through the axis of the shaft 140 on which the pointer 40 is secured which is generally rectangular comprising spaced parallel edges 35—35, a horizontal edge 37 and inclined edges 39—39 connecting the inner ends of the edges 35—35 with the opposite ends of the horizontal edge 37. At the edge of the dial close to the edges 35—35 there are open slots 41—41 and at the center of the horizontal side there is an open slot 43, the latter being in communication with the hole at the center of the scale through which the shaft 140 passes. The slots 44—44 and 43 are parallel and provide means for receiving screw bolts 45—45 and 47 by means of which the dial is removably secured in place. By the simple expedient of loosening the screw bolts without removing them the scale may be slipped off and replaced with a scale of different range for use with different thermal assemblies.

A 12 inch scale is used which provides an accuracy of plus or minus 1% and ranges from $-180°$ F. to $+1000$ F. The unit or modular design makes many switching combinations possible and up to four control switches with single or dual adjustments. The reset switch is for limited control. The component parts are easy to replace and recalibrate and the operatng mechanism will withstand up to 15 G shock and vibrations from 0 to 500 cycles per second.

The instrument is designed to be complete in itself without need for the enclosing housing 10, that is it may be used in skeleton form as illustrated in FIGS. 8 and 12. This reduces the cost and enables installation in restricted spaces where these factors have to be considered.

It should be understood that the present disclosure is for the purpose of illustration only.

I claim:

1. An instrument comprising a housing, a frame adapted to be removably mounted in the housing and to support therein an actuatable part embodying a first actuatable element and means to effect actuation of said first actuatable element; vertically spaced bearing parts adjacent one end of the frame, an actuator arm pivotally connected at one end to one of the bearing parts, a carrier arm pivotally connected at one end to the other of the bearing parts, said arms extending from said bearing parts in substantially parallel relation toward the opposite end of the frame, bearing means on the frame between said arms intermediate their opposite ends, a transmitter rod mounted in the bearing means with one end engaged with the actuator arm and the other adjacent the carrier arm, said actuatable part being mounted on the carrier arm with said first actuatable element in vertically spaced alignment with said other end of the transmitter rod, said transmitter rod being movable in its bearing in response to the movement of the actuator arm to cause said other end of the transmitter rod to actuate said first actuatable element, and means supporting the carrier arm in a position such that said first actuatable element is at an initial predetermined distance from said opposite end of the transmitter rod, including yieldable means connected to said carrier arm and to said frame operating to urge the carrier arm toward said other end of the transmitter rod and means on the carrier arm and the frame cooperable by engagement to limit said movement.

2. An instrument according to claim 1, characterized in that it is designed to be compounded by aligning two or more frames back to front to form a multiple control instrument.

3. An instrument according to claim 1, wherein the actuatable part is a valve or switch provided with a push button and a lever is rotatably mounted with an end adjacent the switch button operable to depress the button in a direction opposite to its displacement by the actuator arm.

4. An instrument according to claim 1, wherein the actuatable part is a valve or switch provided with a first actuatable element which must be manually moved from its operative to its inoperative position and vice versa, and wherein one end is situated in a position to be moved in one direction by the actuator arm, a lever yieldably supported with an end adjacent the other end of the first actuatable element, and means connected to the lever operable to effect rotation of the lever into engagement with said other end.

5. An instrument according to claim 1, wherein the frame has at its front side an adapter and at its rear side a receiver and is adapted to be compounded with another frame by engagement of the adapter of the one frame with the receiver of the second frame and said frames contain bolt holes which in the respective frames align when the frames are compounded to receive bolts for securing the frames together.

6. An instrument according to claim 1, comprising a shaft rotatably mounted on the frame, means operable by the transmitter rod to effect rotation of the shaft, a pointer fixed at one end to the shaft and a dial mounted on the frame with its surface parallel to the sweep of the pointer, said shaft, means, pointer and dial comprising an indicator.

7. A multi-purpose instrument according to claim 6, characterized in that the indicator components may be removed and the instrument employed solely as a switch controller.

8. A multi-purpose instrument according to claim 6, characterized in that said actuatable part may be disabled or removed when the instrument is employed solely as an indicator.

9. An instrument according to claim 1, wherein a limit switch embodying a second actuatable element is mounted on the frame adjacent the actuator arm and there is means on the actuator arm and movable therewith to effect actuation of the second actuatable element of said limit switch when the actuator arm has moved a predetermined angular distance.

10. An instrument according to claim 1, wherein a limit switch embodying a second actuatable element is mounted on the frame, a switch plate is adjustably mounted on the actuator arm, said switch plate embodying a limb movable into engagement with said second actuatable element of said limit switch by movement of the actuator arm, and means for adjusting the position of the switch plate relative to said limit switch to predetermine its point of operation.

11. An instrument according to claim 1, comprising two frames and an adapter joining the two frames with the back of one frame adjacent the front of the other frame, said frames joined by said adapter providing a compound instrument for multiple control.

12. An instrument comprising a frame, an actuator member and a carrier member mounted on the fame for movement relative to each other, a transmitter member mounted on the frame between the actuator member and the carrier member with one end engaged with the actuator member, a part embodying a first actuatable element mounted on the carrier member with said first actuatable element confronting the other end of the transmitter member, said transmitter member being movable in response to movement of the actuator member to cause said other end of the transmitter member to actuate said first actuatable element and a cam rotatably mounted on the frame, said cam having a surface which supports the carrier member and which is rotatable relative thereto to adjust the relative position of said first actuatable element and said other end of the transmitter member.

13. An instrument according to claim 12, wherein an adjustable screw is threaded through the carrier member with one end in engagement with said cam, said screw being adjustable to effect an initial calibration of the instrument.

14. An instrument according to claim 12, wherein a spring yieldably holds the carrier member engaged with the cam surface.

15. An instrument according to claim 12, comprising a cut-off switch mounted on the frame adjacent the surface of the cam operable by engagement of the cam surface therewith to prevent setting the limit too high or too low.

16. An instrument comprising a frame, an actuator member and a carrier member mounted on the frame for movement relative to each other, means on the carrier member adapted to support a plurality of parts each of which embodies a first actuatable element, a transmitter member for each of said parts mounted on the frame with one end in a position to be operated upon by said actuator member and the other end confronting one of said first actuatable elements, said transmitter members being movable in response to movement of the actuator member to cause the other ends therefore to actuate said first actuatable elements and means operable to adjust the confronting end of each transmitter member relative to said first actuatable element of the part with which it is associated to effect actuation of the several parts at different times.

17. An instrument comprising a frame, an actuator member and carrier member mounted on the frame for movement relative to each other, a rack mounted on the frame between the actuator member and carrier member with one end in engagement with the actuator member, a part embodying a first actuatable element mounted on the carrier member with the first actuatable element confronting the opposite end of the rack, said rack being movable in response to movement of the actuator member to cause said other end of the rack to actuate said first actuatable element, a pinion on the shaft in mesh with the rack, movement of the rack being operable to effect simultaneously rotary movement of the shaft, a pointer on the shaft rotatable in a plane perpendicular to the shaft, and a dial parallel to said plane over which the pointer sweeps.

18. An instrument comprising a frame, an actuator member and a carrier member mounted on the frame for movement relative to each other, a transmitter member mounted on the frame between the actuator member and the carrier member with one end engaged with the actuator member, a part embodying a first actuatable element mounted on the carrier member with the first actuatable element confronting the other end of the transmitter member, the transmitter member being movable in response to the movement of the actuator member to cause said other end of the transmitter member to actuate said first actuatable element; characterized in that the frame contains concentric circular recesses in its front and rear sides, an adapter, one end of which is adapted to be removably seated in the recess in the front side and the other end of which is adapted to be seated in the recess in the rear side of a frame placed next to it, whereby two or more frames are adapted to be joined by engagement of the ends of the adapter with the recesses in said frames to form in combination with the adapters a compound structure for multiple control.

19. An instrument comprising an elongate frame, said frame being relatively narrow from front to back and containing aligned recesses at the back and front, a hollow hub having ends, said hollow hub being fixed with one end in the recess at the front and extending forwardly from the front, a cam rotatably mounted on the hub, an actuator arm and a carrier arm pivotally mounted on the frame below and above the recesses, an actuatable part mounted on the carrier arm, a rod mounted on the frame with one end adjacent the carrier arm and the other end adjacent the actuator arm for movement by the latter to effect engagement of the end adjacent the carrier arm with said actuatable part to actuate the same, and a pressure-responsive device associated with the actuator arm operable to effect movement thereof in response to a change in pressure, said cam being operable to pre-position the carrier arm relative to the rod for operation of said actuatable part at a predetermined pressure, and said hub being adapted to be interengaged at its other end with the recess in a like frame at the rear side of the latter for compounding the instrument for multiple control.

20. An instrument according to claim 19, wherein the frame contains annular shoulders in the front and back surfaces surrounding the recesses and the hollow hub has at one end a circular shoulder adapted to fit into the shoulder at the front of one frame and at its other end a circular shoulder adapted to fit into the shoulder at the rear of said like frame by means of which two or more frames are adapted to be compounded.

21. An instrument comprising a frame, an actuator member and a carrier member mounted on the frame for movement relative to each other, a transmitter member mounted on the frame between the actuator member and the carrier member with one end engaged with the actuator member, a part embodying a first actuatable element mounted on the carrier member with said first actuatable element confronting the other end of the transmitter member, said transmitter member being movable in response to movement of the actuator member to cause said other end of the transmitter member to actuate said first actuatable element, a pressure-responsive member operably associated with the actuator member for effecting movement thereof and means for adjusting the position of the pressure-responsive member relative to the actuator member to change the ratio of movement of the actuator member for a given movement of the pressure-responsive member.

22. An instrument comprising a frame, a switch or valve, supporting means on the frame on which means is mounted the switch or valve, said switch or valve embodying an actuator pin, a pressure responsive element, mechanism for transmitting the movement of the pressure responsive element to the pin, a dial, a pointer supported for movement across the dial, said pointer being movable by said mechanism across the dial to indicate the pressure at which the switch or valve is operated; characterized in that the frame is constructed to enable combining two or more frames one behind the other, each with a switch or valve, a pressure-responsive element, and a pointer, with a single dial on the foremost frame and with means supporting the several pointers for movement over the single dial, each pointer being independently movable relative to every other pointer by the mechanism associated therewith.

23. An instrument comprising a frame, an actuator member and a carrier member mounted on the frame for movement relative to each other, means on the carrier member supporting one or more parts each of which has a first actuatable element, transmitter rods mounted on the frame between the actuator member and the carrier member corresponding in number to the number of parts on the carrier member, each transmitter rod being supported with one end in engagement with the actuator member and its other end in spaced relation to one of said first actuatable elements, adjustable means mounted on the frame for limiting movement of the carrier member toward the actuator member, and a spring connected at one end to the carrier member and at its other end to the frame, said spring operating to hold the carrier member engaged with said adjustable means.

24. An instrument comprising an elongate frame which is relatively narrow from front to back, said frame containing an opening through it having front and back ends, recesses surrounding the front and back ends of the opening, a hollow hub having ends, said hollow hub being fixed at one end in the recess at the front end of the opening and extending therefrom, a cam disc rotatably mounted on the hub, a dial fixed to the forward end of the hub, an actuator arm and a carrier arm pivotally mounted on the frame below and above the recesses therein, an actuatable part mounted on the carrier arm, a rod mounted on the frame between the arms with its lower end engaged with the actuator arm and its upper end engaged with said actuatable part, said rod projecting through the opening of the frame and said portion of the rod passing through said opening having on it a rack, a shaft rotatably supported at one end in the frame and at the other end in the hub with an end projecting therefrom, a pointer on the projecting end of the shaft supported thereby parallel to the dial, a gear on the shaft within the opening in the frame in mesh with the rack, a pressure-responsive element associated with the actuator member operable to effect movement thereof in response to a change in pressure and in turn to displace the rod, said rod being operable by such displacement to actuate said actuatable part and simultaneously rotate the pointer to a position to indicate the pressure at which said actuatable part is actuated, and means for effecting rotation of the carrier arm to preposition the carrier arm relative to the actuator arm to determine the pressure at which the pressure-responsive means will become effective to actuate the actuatable part.

References Cited

UNITED STATES PATENTS

| | | | |
|---|---|---|---|
| 2,312,787 | 3/1943 | Allen | 73—388 |
| 2,345,464 | 3/1944 | De Giers | 73—410 |

LOUIS R. PRINCE, Primary Examiner

DENIS E. CORR, Assistant Examiner

U.S. Cl. X.R.

73—362.2, 368.7, 410; 200—81.5